May 21, 1935.   E. F. SCHROEDER   2,002,129
RODENT TRAP
Filed Feb. 21, 1934   2 Sheets-Sheet 1
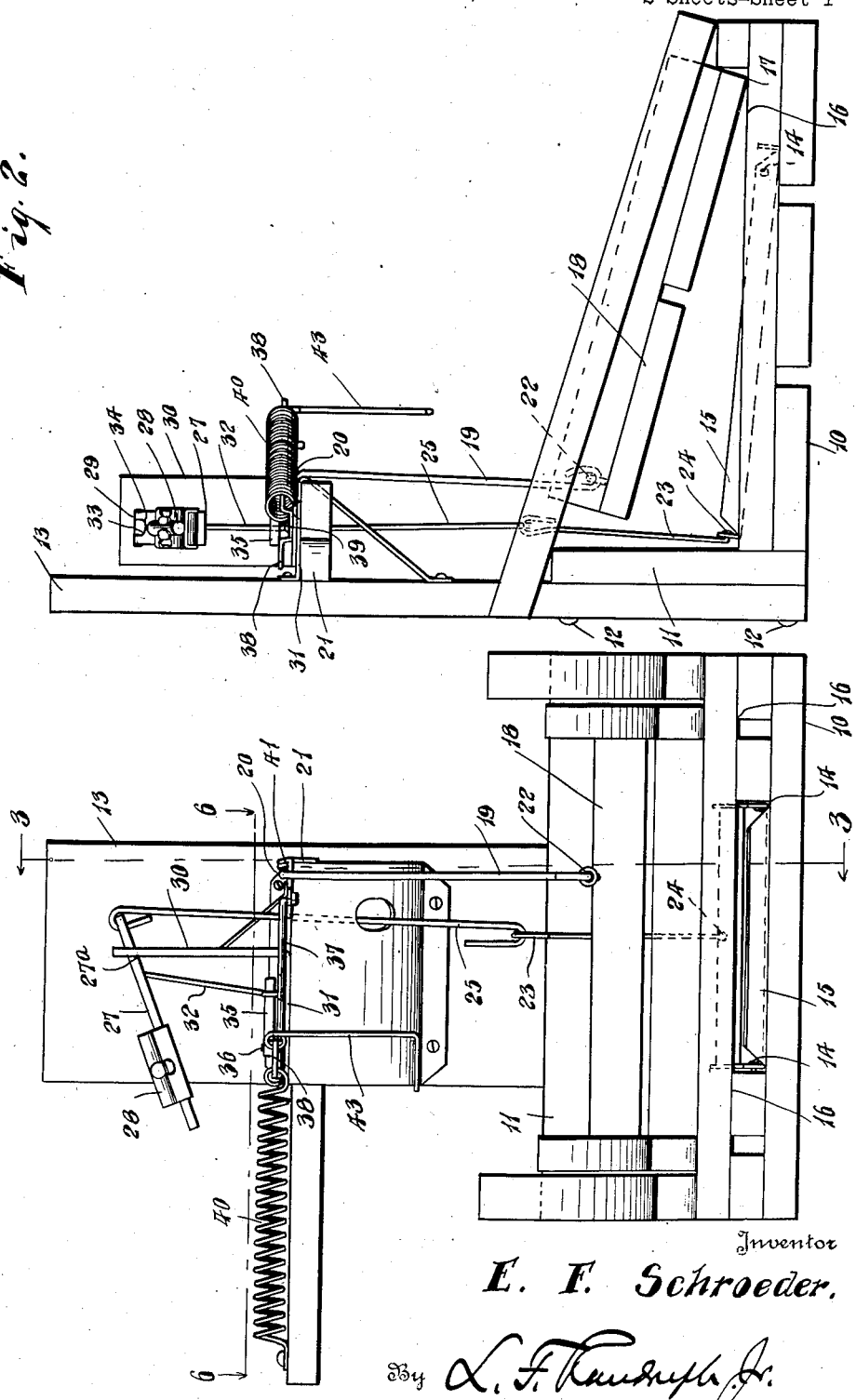
Inventor
E. F. Schroeder,
By [signature]
Attorney May 21, 1935.　　　　　E. F. SCHROEDER　　　　　2,002,129
RODENT TRAP
Filed Feb. 21, 1934　　　　2 Sheets—Sheet 2
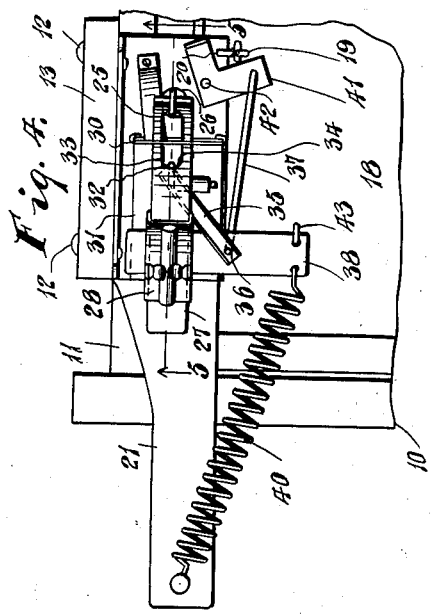
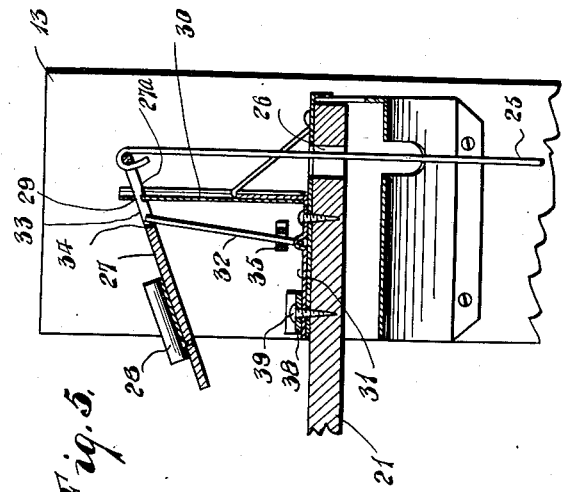
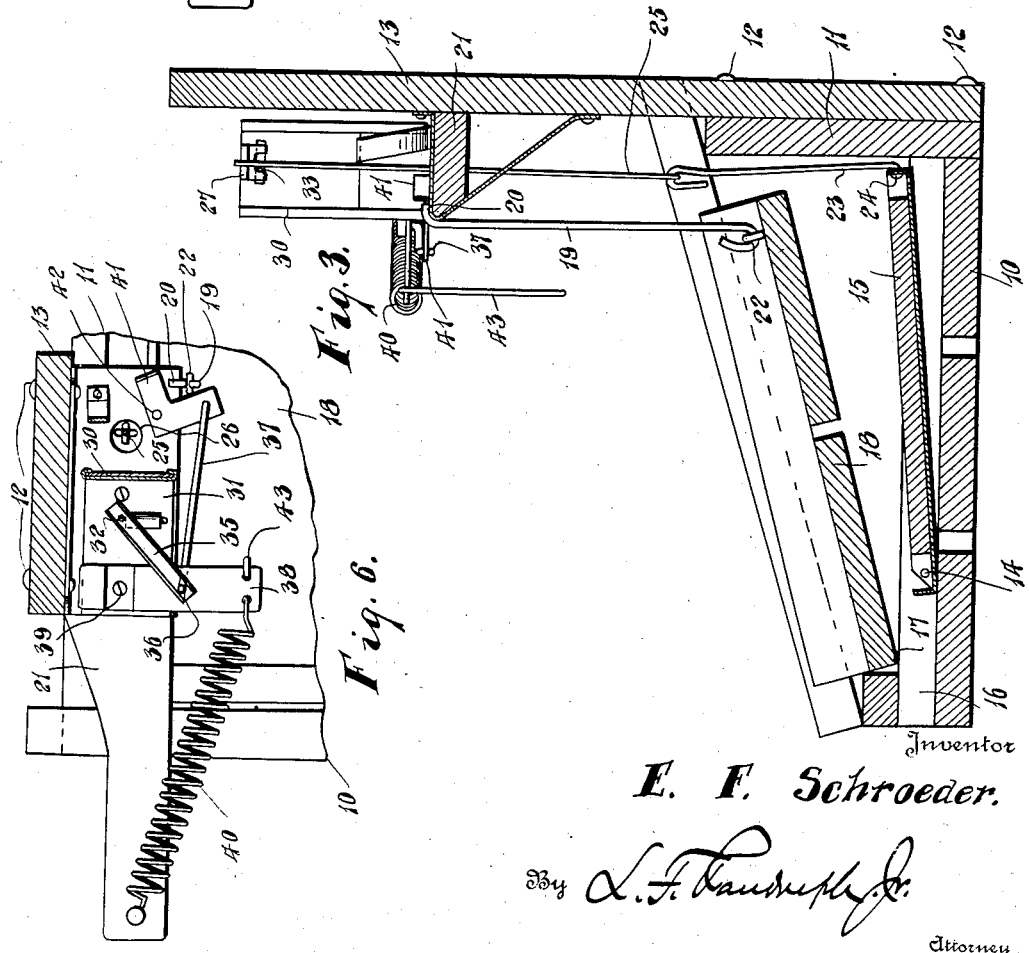
Inventor
E. F. Schroeder.
By L. F. Randolph, Jr.
Attorney Patented May 21, 1935

2,002,129

UNITED STATES PATENT OFFICE 2,002,129

RODENT TRAP

Emil F. Schroeder, Weyauwega, Wis.

Application February 21, 1934, Serial No. 712,388

2 Claims. (Cl. 43—62)

This invention relates to a rodent trap and it aims to provide a novel construction adapted to capture the animals or rodents, such as rats and mice in a more humane noiseless, and bloodless manner.

The invention is also capable of use as a trap for catching birds or desirable animals alive.

A particular object is to provide a novel construction wherein the luring means comprises two elements providing a runway between the same and open at both ends.

The more specific objects and advantages will become apparent from a consideration of the description following, taken in connection with accompanying drawings illustrating an operative embodiment.

In said drawings:—

Figure 1 is a view of the trap in front elevation,

Figure 2 is a view of the trap in end elevation,

Figure 3 is a vertical sectional view taken on the line 3—3 of Figure 1,

Figure 4 is a partial plan view of the trap,

Figure 5 is a detail sectional view taken on the line 5—5 of Figure 4, and

Figure 6 is a sectional view taken on the line 6—6 of Figure 1.

Referring specifically to the drawings, wherein like reference characters designate like or similar parts, 10 designates a base of wood, metal, or other desired material having a side 11 rising therefrom to which is attached in any suitable manner as at 12, a standard 13. Pivoted to the base 10 at 14, is a trip platform 15.

Loosely resting on a raised portion 16 of the base, at an edge 17, is a capturing member 18 shown in the form of a platform. Said capturing member 18 in the set condition of the trap as shown in Figures 2 and 3 provides a space between the same and the trip member 15, such space being open at the ends although closed at the sides. Such a space forms a natural lure for rodents, such as rats, mice and the like and they will pass through the same so that the trap does not have to be baited to lure them. The weight of an animal on the trip member 15 operates mechanism which releases capturing member 18. This capturing member is adapted to be suitably weighted, to which end, rocks or any means affording the desired weight may be superposed thereon. The capturing member 18 in this instance, when released, will instantly kill the animal.

In the set condition of the trap, the capturing member 18 is held elevated at one end as in the drawings, through the engagement of a hook 20 of a link 19, with a shelf or projection 21 on the standard, such link 19 being loosely and pivotally connected as at 22 to the capturing member. The trip member 15 is also, in the set condition of the trap elevated at one end, being so maintained by reason of a link 23 loosely pivoted to the trip 15 at 24. A flexible element 25 is connected to the link 23, passing through an opening 26 in the shelf 21, and thence being connected to a trigger lever 27 along which a weight 28 is adjustably slidable.

Trigger lever 27 passes through an opening 29 in a vertical portion 30 of a bracket 31 suitably fastened to the shelf 21. Trigger lever 27 passes loosely through the slot 29 and at any suitable point along its length is adapted to fulcrum on the portion 30 in said opening 29. Said trigger lever 27 preferably has a slot or groove at 27a for pivotal engagement with the bracket 30 as shown. A rod or finger 32 is adapted to be manually disposed at its upper or free end into a slot 33 and engage a shoulder 34 of the trigger lever 27, to hold the trap in a set condition with one end of the trip lever 15 elevated as shown. The operation of the device will depend upon the weight of the rodent and when a rodent of sufficient weight treads upon the trip platform 15 a pull will be exerted on the link 23 and link, rod or cable 25, thus tilting the lever 27 and disengaging it from the rod 32. The rod 32 extends from a link or bar 35 which is pivotally connected at one end 36 to a connecting rod 37, of a lever 38 pivoted at 39 to the bracket 31 and shelf 21. Lever 38 is normally maintained retracted by a contractile spring 40 attached thereto, and to the shelf 21 or adjacent part. Said rod 37 is pivotally connected to a bell crank lever 41, pivoted at 42 to the shelf 21 or bracket 31 thereon. The free arm of the lever 41, in the set condition of the trap, abuts the free end of the hook 20, the spring 40 obviously being tensioned when the trap is set. Rod 43 facilitates tensioning of the spring 40.

As a result of the construction described, the weight 28 may be adjusted so that the trip 15 will lower under the desired weight of an animal, and all below that weight being permitted to freely pass thereover, if desired, without operating the trap. Downward movement of the trip 15 under the weight of the animal moves the links 23 and 25 downwardly, accordingly tilting the lever 27 so that it will be thrown upwardly at the weighted end thereof, releasing the rod or finger 32, whereupon the spring 40 retracts the lever 38 and rod 37, rocking the bell crank lever 41 and causing its arm to move the hook 20 off of the shelf 21, whereupon the capturing member 18 is free to rapidly descend to crush the animal between the capturing member 18 and the trip 15.

Particular attention is called to the fact that the runway between the trip 15 and capturing member 18 provides sufficient space to squeeze the breath out of the rodent so that it cannot squeal, and sufficiently covers the rodent so his companions cannot see him or become suspicious. The animal will not bleed and hence the trap may always be kept clean. Vibration or jars will not discharge the trap.

Various changes may be resorted to provided they fall within the spirit and scope of the invention.

I claim as my invention:—

1. A trap of the class described having a base, a standard rising therefrom, a shelf on said standard, a trigger lever, means pivoting said lever on said shelf, a trip member on the base, means flexibly connecting the trip member and trigger lever, a capturing member supported on the base and coacting with the trip member, link means extending from the capturing member having a hook engageable with said shelf in set position, a detent member for said trigger lever, a lever carrying said detent member, a contractile spring connected to the last mentioned lever and to actuate the same when the trigger lever is released, and means connected to the last mentioned lever engageable with said hook to release said link means when the trap is sprung.

2. A trap of the class described having a base, a standard rising therefrom, a shelf on said standard, a trigger lever, means pivoting said lever on said shelf, a trip member on the base, means flexibly connecting the trip member and trigger lever, a capturing member supported on the base and coacting with the trip member, link means extending from the capturing member having a hook engageable with said shelf in set position, a detent member for said trigger lever, a lever carrying said detent member, a contractile spring connected to the last mentioned lever and to actuate the same when the trigger lever is released, a lever member on said shelf, and a connection operable by the lever to cause the lever member to engage and displace said hook.

EMIL F. SCHROEDER.